INVENTOR
STEPHEN W. STORTZ

Feb. 28, 1956     S. W. STORTZ     2,736,214
PLANETARY GEAR TRANSMISSION

Filed Nov. 3, 1954     3 Sheets-Sheet 2

INVENTOR
STEPHEN W. STORTZ

BY

ATTORNEYS

Feb. 28, 1956  S. W. STORTZ  2,736,214
PLANETARY GEAR TRANSMISSION
Filed Nov. 3, 1954  3 Sheets-Sheet 3

INVENTOR
STEPHEN W. STORTZ

BY
Young & Wright

ATTORNEYS

United States Patent Office 2,736,214
Patented Feb. 28, 1956

2,736,214

PLANETARY GEAR TRANSMISSION

Stephen W. Stortz, Fort Atkinson, Wis.

Application November 3, 1954, Serial No. 466,614

3 Claims. (Cl. 74—752)

This invention appertains to the transmission of power and more particularly to a novel mechanism for gradually and automatically picking up a load by a driving motor.

One of the primary objects of my invention is to provide a simple and compact element adapted to be interposed between the driving member and the driven member for gradually transmitting the driving force from the driving member to the driven member from an idling speed to a high speed or direct coupling.

Another salient object of my invention is the provision of a transmission embodying a planetary gearing having the planet gears rotatably carried by a rotating casing driven from a suitable motor and constituting the drive member meshing with a sun gear carried by an axially disposed power take off shaft, with means for gradually holding the planet gears against rotation on the casing as the speed of the casing increases to ultimately drive the sun gear direct from the casing and at the same speed.

A further important object of my invention is the provision of means embodying an eccentric ring carried by the planet gears with automatic means for engaging the ring to gradually bring about the locking of the planet gears with the casing.

A still further important object of my invention is the provision of a centrifugal governor actuated from the driving member for operating rollers to bring about the gradual holding of the eccentric ring and the planet gears locked on the casing against rotation.

Figure 1:
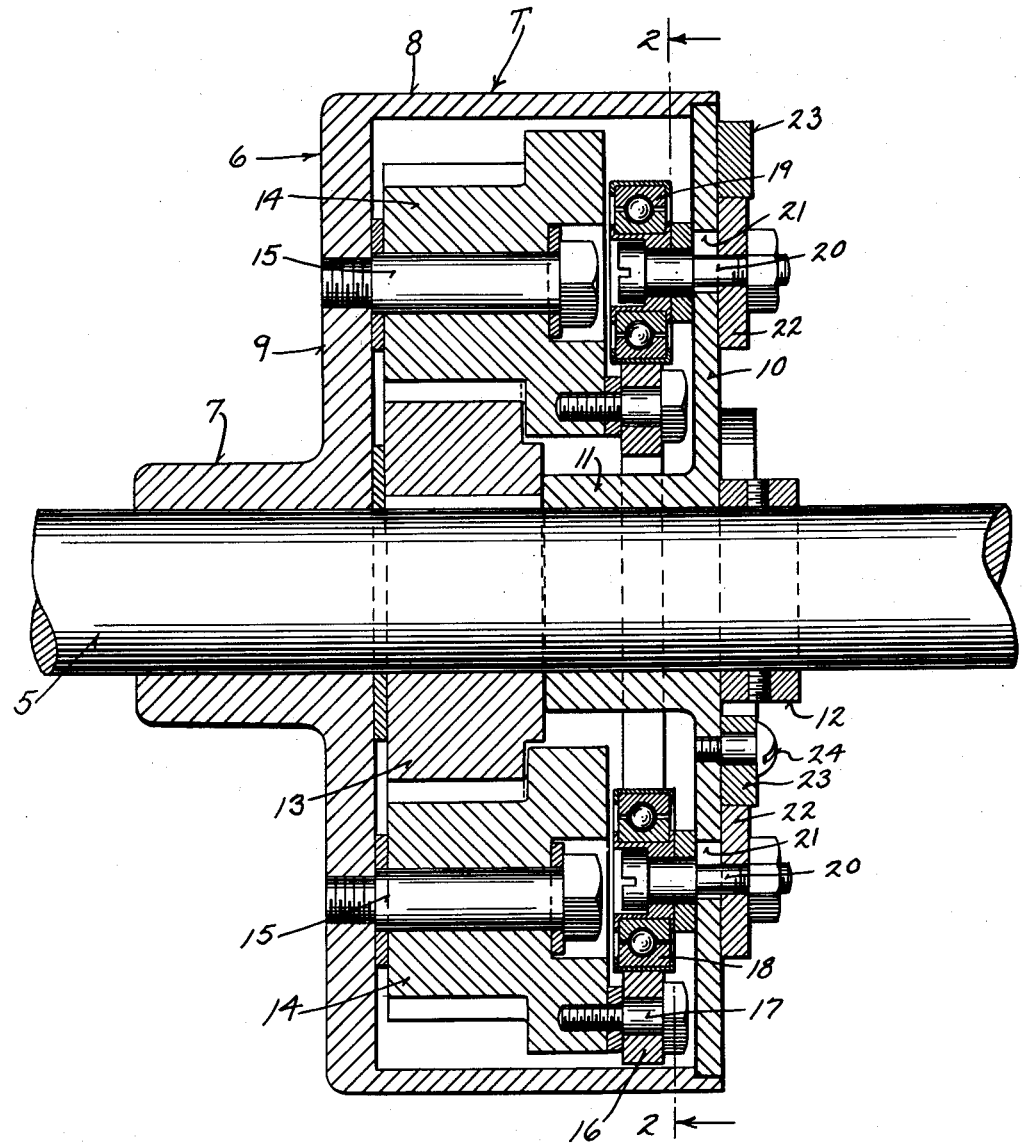
Figure 2:
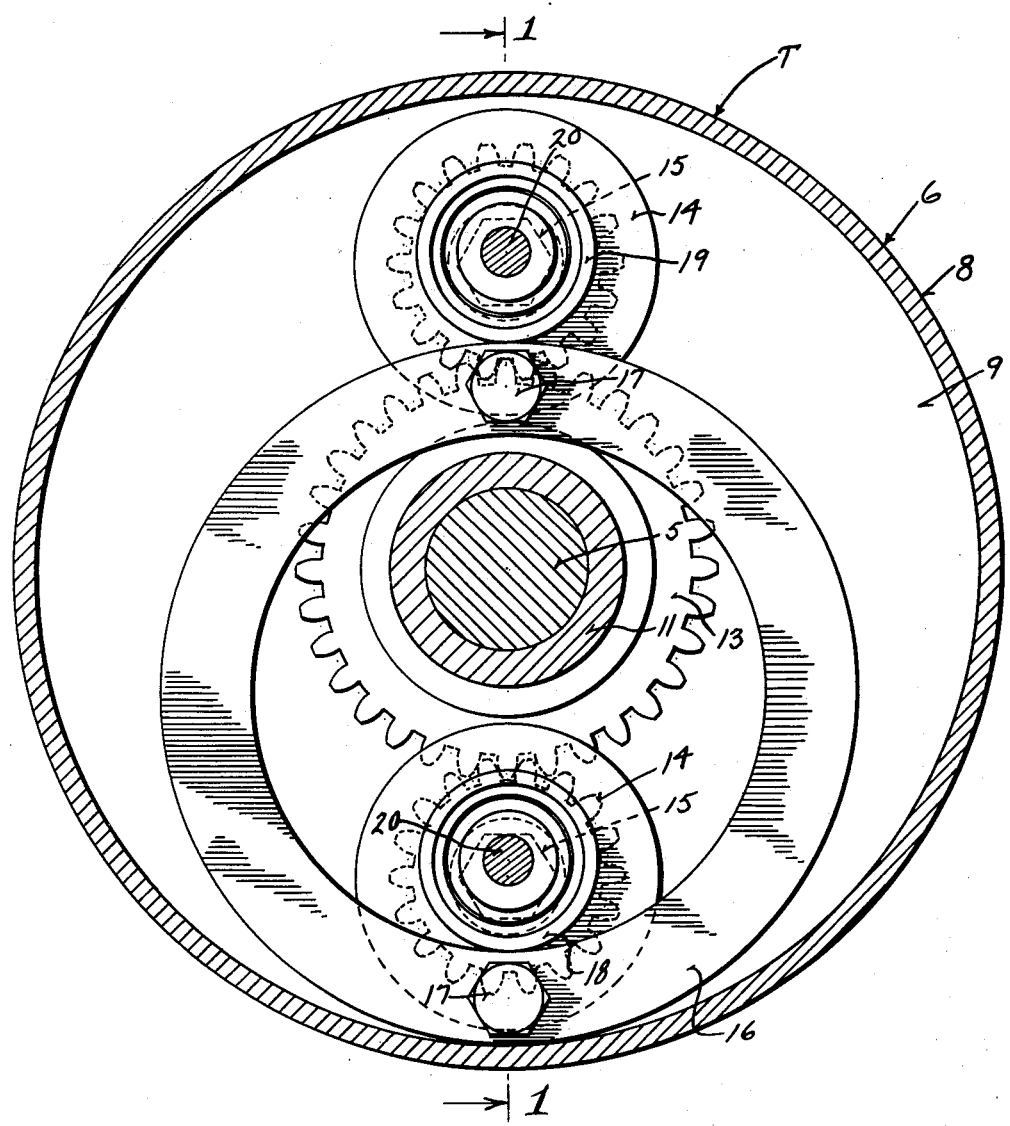
Figure 3:
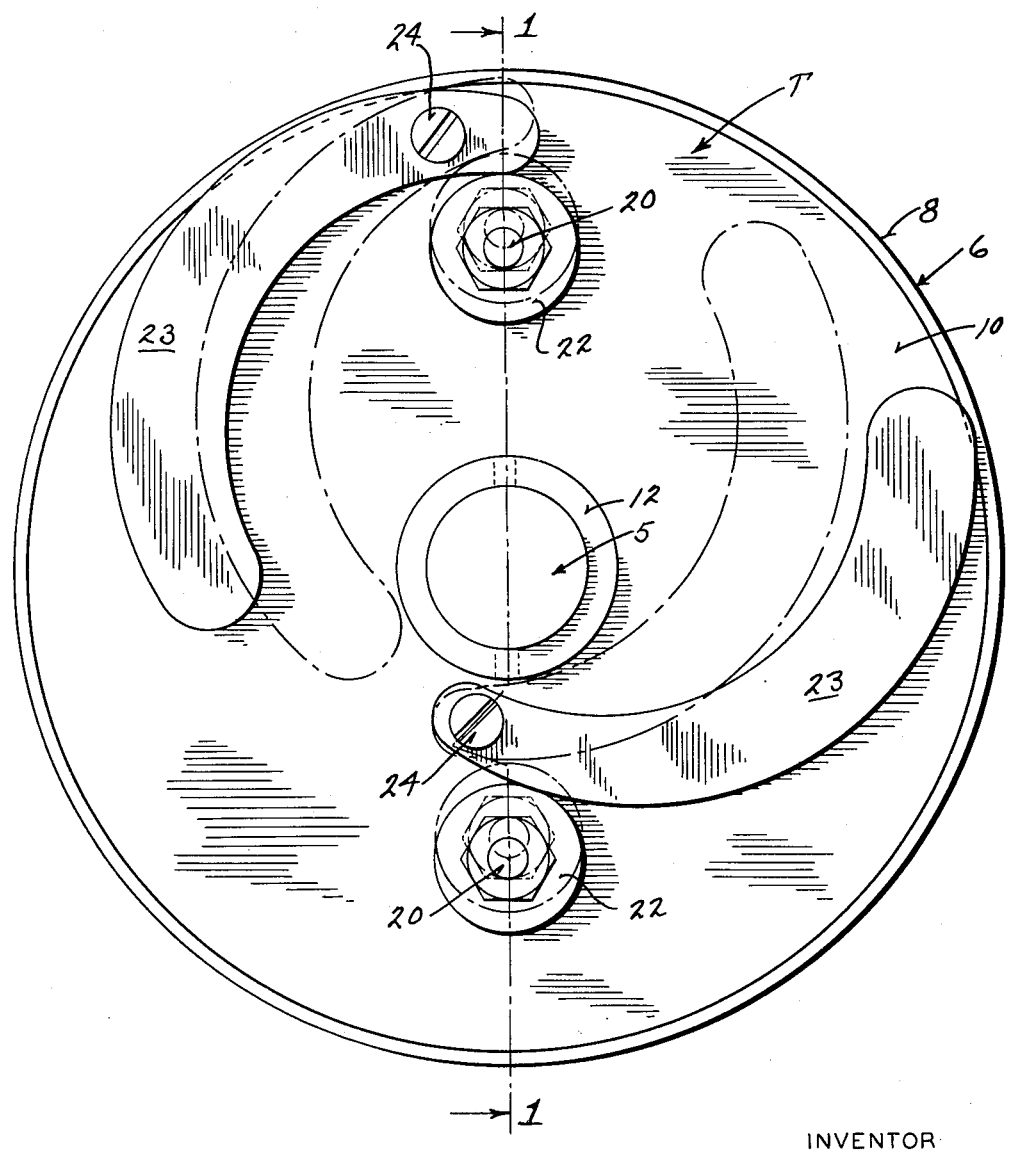

With these and other objects in view, the invention consists in the novel construction, arrangement and formation of parts, as will be hereinafter more specifically described and claimed, and illustrated in the accompanying drawing, in which drawing, Figure 1 is a diametrical sectional view through my novel transmission, the section being taken on the lines 1—1 of Figures 2 and 3;

Figure 2 is a sectional view through the transmission taken on the line 2—2 of Figure 1, looking in the direction of the arrows, the view illustrating the eccentric ring coupled with the planet gears with the operating rollers engaging the ring, and Figure 3 is an end elevational view of the transmission showing the governor for bringing about the operation of the rollers according to the speed of the driving member.

Referring to the drawings in detail, wherein similar reference characters designate corresponding parts throughout the several views, the letter T generally indicates my novel transmission and the same includes an axially disposed shaft 5, which in the present instance can be considered as a power take off shaft for operating any desired mechanism. Rotatably mounted on the shaft 5 is a casing 6 and this casing includes a bearing hub sleeve 7 for receiving the shaft 5 and an annular rim 8, which in the present instance constitutes the drive member. This rim can constitute a pulley wheel as shown, for a pulley belt, or can be provided with a ring gear to be operated from the fly wheel of a motor. The rim 8 is connected with the hub sleeve 7 by an integral disc-shaped wall 9.

A closure plate 10 is provided for the casing and this closure plate is provided with a hub sleeve 11 which is rotatably mounted on the shaft 5. The periphery of the closure plate 10 has free bearing contact with the rim 8, as best shown in Figure 1. A holding collar is secured to the shaft 5 against the closure plate 10 to aid in preventing lateral shifting of the plate in one direction.

Keyed, or otherwise secured, to the shaft 5 for rotation therewith is the sun gear 13 and meshing with the sun gear are normally idle planet gears 14 freely rotatable on stub shafts 15 carried by the wall 9 of the casing. Hence, from the description so far, it can be seen that upon rotation of the casing 6 the planet gears 14 rotate and travel around the sun gear and no movement is imparted to the shaft 5.

Eccentrically disposed within the casing 6 is a lock ring 16 and this ring is connected to the planet gears 14 by eccentrically disposed stub shafts 17 carried by the planet gears 14. The stub shafts 17 freely turn in the ring 16 and consequently during rotation of the planet gears 14 the ring 16 moves with the planetary gears in a gyratory motion.

Bearing against the inner and outer periphery of the lock ring 16 are rollers 18 and 19 and these rollers are carried by stub shafts 20 mounted on the closure plate 10. The rollers are mounted for free rotation on their stub shafts 20 and roller bearings and races are utilized to decrease friction.

The closure plate 10 is provided with diametrically extending slots 21 and the stub shafts 20 slide in these slots toward and away from the axis of the casing. Mounted on the stub shafts 20 are washers 22 for closing the slots 21 and means is provided for engaging these washers for moving the stub shafts 20 and consequently the roller 19 according to the speed of rotation of the casing 6. This means includes arcuate weighted arms 23 pivoted at their inner ends on stud bolts 24 carried by the cover plate 10. As the arms 23 move outwardly under centrifugal force due to rotation of the cover plate 10, the same press against the washers 22 for moving the rollers 18 and 19 against the inner and outer peripheries of the lock ring 16 for gradually holding the lock ring against rotation. It is to be noted that the roller 18 is moved outwardly by its arm 23 for engaging the inner periphery of the ring 16, while the roller 19 is moved inwardly into engagement with the outer periphery of the ring by its weighted arm 23.

In operation, and again considering that the casing 6 is the drive member and the shaft 5 is at rest: upon rotation of the casing 6 at an idling speed and at a speed which is insufficient to affect the arms 23 the planet gears will rotate freely and travel around the sun gear 13 and the lock ring 16 will merely push against the rollers 18 and 19 and move the roller 18 inwardly and the roller 19 outwardly and no movement will be imparted to the shaft 5. As the speed of the casing 6 increases, the ring 16 bearing on the rollers 18 and 19 will rotate the cover plate 10 and upon continued speed increase the arms 23 will move outwardly pressing the roller 18 outwardly and the roller 19 inwardly and bring about the gradual holding of the ring to decrease the free rotation of the planet gears 14 and hence bring about the gradual rotation of the shaft 5. When the casing 6 reaches a high speed sufficient to bring about the extreme outward movement of the arms 23, the roller 18 will be moved out and the roller 19 moved in to their extreme positions, at which time the stub shafts 20 and the shaft 5 will be in diametric alignment and the planet gears 14 will be held against rotation so that the shaft 5 will be driven directly from the casing 6. Obviously, as the speed of the casing 6 decreases and the governor arms 23 are relieved of centrifugal force, the lock ring 16 will push against the rollers 18 and 19 and move the roller 18 gradually inward and the roller 19 gradually outwardly until the casing 6 reaches an idle speed, and at which time the planet gears 14 can rotate freely on their stub shafts around the sun gear 13.

While I have stated that the casing 6 is the drive member and the shaft 5 the driven member, it is to be understood that in some instances the shaft 5 can be the drive member and the casing 6 the driven member, and for the sake of clearness the claims define the casing 6 as the drive member and the shaft 5 as the driven member, but the invention is not so limited.

Various other changes in details may be made without departing from the spirit or the scope of the invention, but what I claim as new is:

1. A transmission comprising a rotatable shaft, a casing rotatable on the shaft, a sun gear disposed within said casing and secured to the shaft for rotation therewith, idle planet gears meshing with the sun gear and normally rotatably carried by the casing, an eccentrically disposed lock ring movable within the casing and eccentrically mounted on the planet gears for turning movement, a cover plate for said casing rotatable relative to the shaft and the casing, and means responsive to the speed of the cover plate engaging said ring for gradually holding the planet gears against free rotation upon increased speed of the cover plate.

2. A transmission comprising a power take off shaft, a drive casing mounted for normal free rotation on the shaft, a sun gear secured to the shaft for rotation therewith disposed within said casing, normally idle planet gears rotatably mounted in said casing and meshing with the sun gear, a locking ring in said casing, stub shafts rotatably connecting the ring eccentrically to the planet gears, a cover plate for the casing rotatable relative to the shaft and casing, rollers slidably mounted on the cover plate for movement toward and away from the shaft engaging the inner and outer periphery of the ring, and a centrifugally operated governor carried by the cover plate including movable arms for shifting the rollers relative to the ring according to the speed of the casing.

3. A transmission comprising a power take off shaft, a drive casing freely rotatably mounted on the shaft, a sun gear disposed within the casing and secured to the shaft for rotation therewith, normally idle planet gears rotatably mounted within said casing and carried thereby meshing with the sun gear, a lock ring, stub shafts eccentrically connecting the ring with the planet gears, a cover plate for the casing rotatable relative to the shaft and casing, rollers engaging the inner and outer peripheries of the ring, stub shafts supporting the rollers extending through the cover plate and slidably mounted on said cover plate for movement toward and away from the shaft, a governor responsive to the speed of the casing carried by said cover plate and including pivoted weighted arms and means for sliding the rollers and their stub shafts relative to the ring from said arms.

References Cited in the file of this patent

UNITED STATES PATENTS 2,458,389    Korum _____ Jan. 4, 1949